United States Patent

[11] 3,563,617

| | | |
|---|---|---|
| [72] | Inventor | James L. Pritchard |
| | | 52 Needham St., Norfolk, Mass. 02056 |
| [21] | Appl. No. | 831,345 |
| [22] | Filed | June 9, 1969 |
| [45] | Patented | Feb. 16, 1971 |

[54] ANTIFRICTION WAY SYSTEM FOR PRECISION INSTRUMENTS
8 Claims, 6 Drawing Figs.

[52] U.S. Cl. ................................................. 308/6
[51] Int. Cl. ................................................. F16c 29/06
[50] Field of Search ........................................ 308/3.8, 6, 3(A)

[56] References Cited
UNITED STATES PATENTS
3,046,053  7/1962  Pearstine ..................... 308/6

Primary Examiner—Fred C. Mattern, Jr.
Assistant Examiner—Frank Susko
Attorney—John F. McClellan, Sr.

ABSTRACT: A linear, horizontal ball bearing system including preloaded spring centering and spacing means for the balls comprising a flexible sheet perforated for ball retention and having spring connection to a post affixed to a way by compression springs positioned in an aperture in the spacing means.

PATENTED FEB 16 1971

JAMES L. PRITCHARD
INVENTOR

BY *John F. McClellan Sr.*
ATTORNEY

PATENTED FEB 16 1971 3,563,617

JAMES L. PRITCHARD
INVENTOR

BY *John F. McClellan Sr.*
ATTORNEY

ANTIFRICTION WAY SYSTEM FOR PRECISION INSTRUMENTS

This invention relates to way systems and particularly to linear way systems having antifriction elements such as balls, and means for spacing and centering the antifriction elements and for damping vibration attendant to operation of such way systems.

Major design problems inherent in antifriction linear way systems include problems of spacing, centering, and damping the rolling elements. Without proper spacing, the rolling elements tend to bunch together, and without proper centering the rolling elements tend to migrate to and bind against any travel limiter provided to prevent spilling of the rolling elements from the way system.

The problems encountered in linear way systems of the type described thus differ from those encountered in endless bearing systems, such as circular systems, and different solutions must be employed.

In the prior art, various way systems with devices to center and space the rolling elements have been suggested. By and large these devices have been relatively difficult to seal, unduly extended, vulnerable to damage, and of dubious damping qualities. Not found in the prior art way systems is a minimum size and weight, easily sealed, automatically corrective spacing and centering device, and one which is particularly adapted for use with sensitive linear way systems by virtue of low friction coupled with reproducible damping and centering.

Scientific instruments for studies in interference spectroscopy are especially vulnerable to way system perturbations. Interferometers representative of the best currently available provide stroke ranges (way excursions) of 0.05 mm. to 5 cm.max. at frequencies of 1 cm./3 hrs. to 1 cm./sec. Independent oscillations excited in parts of the apparatus can degrade measurements, and are not tolerable in such interferometric measurements beyond 4 percent.

The way system described in this application was designed for use in interferometers and has proved reliable in use through 3 million cycles, not showing any impairment of function as result of such use.

Among the objects of this invention therefore are to provide a horizontal way system having rolling antifriction means therein constrained by a corrective spacing and centering device of minimal weight and complexity;

to provide a system as described in which the spacing and centering device is effectively vibration damped throughout the range of travel of the way system;

to provide a system as described in which the spacing and centering device is preloaded in both directions of way travel to eliminate backlash;

to provide a system as described in which the spacing and centering device is compactly deployed within the way system, inherently providing for uniformity of temperature expansion throughout the device, and making possible easier sealing of the way system;

to provide a system as described in which the centering device is central to the spacing member which is a part of the device, and in which the spacing member is constantly in tension throughout the central portion thereof, to avoid buckling under load;

to provide a system as described in which the spacing and centering device includes a flat, flexible piece adapted for bistable positioning to contribute to system damping;

to provide a system as described in which the preloading means is self-adjusting and comprises extension springs arranged for carriage by the spacing means, and for lateral guidance and damping by the way system;

to provide a system as described in which the spacing means is adapted to equalize load on the rolling elements by accommodative distortion;

to provide a system as described in which the spacing and centering device is optimally adapted for accommodative centering on the stroke of the way system; and to provide a device which tends to retain lubricant within the way system.

Briefly stated, the objects of this invention are realized in the structure of reciprocating linear ball bearing ways in which separation of the balls and centering of the balls about mid-stroke of the way system is achieved by use of a relatively thin, flat, perforated strip extended in the gap between the ways, the strip having opposed springs in an aperture central of the strip, acting against the ends of the opening and centrally against either side of a self-aligning post anchored in the stationary ways.

These and other objects of this invention will become more readily understood upon examination of the following detailed description, and the drawings in which.

Figure 1:
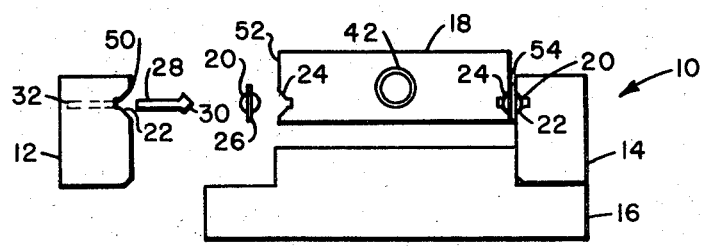
FIG. 1 is an end elevation, in partial assembly, of a way system.

Turning now to FIG. 1 in detail, slide assembly 10 comprises fixed ways 12 and 14 screw mounted to baseplate 16 and bearing between them symmetrically on antifriction means, moving way 18.

The antifriction means consist of sets of balls 20 in laterally opposed raceways 22 and 24 of the fixed and moving ways respectively. Each raceway comprises two plane surfaces forming a V; the V's are substantially symmetrical about a horizontal plane passing through the raceways.

Perforated flat strip spacers 26, vertically hung on the sets of balls, space the balls.

Figure 2:
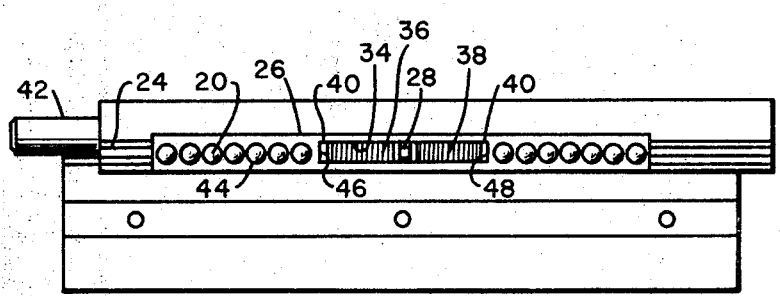
FIG. 2 is a side view in partial section of the FIG. 1 device.
Figure 3:
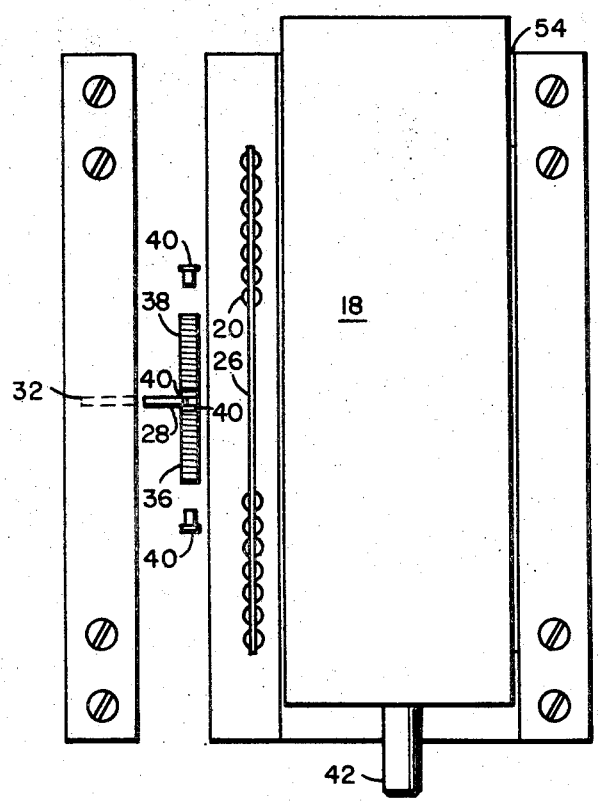
FIG. 3 is a plan view, in partial assembly, of the FIG. 1 device.

As best shown in FIGS. 2 and 3, spacers 26, and springs 36 and 38, serve to center the balls 20 with respect to the fixed way system, through pin 28.

The springs 36 and 38 are spiral compression-springs of piano wire or other suitable material, and are preferably fitted at each end of each spring with a cap 40 of brass or other suitable material, partially inserted in the spring.

The springs are installed in opposition in spacer aperture 34 (FIG. 2), and the outermost caps bear respectively on the ends 46 and 48 of the aperture. Carefully matched springs are used if system accelerations are equal in the half cycles, otherwise a heavier spring is used on the side in the direction of greater acceleration.

Figure 5:
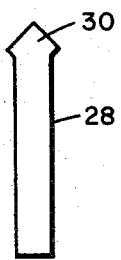
FIG. 5 is a pin.

Pin 28, held in socket 32 in the stationary way, separates the springs at the center. As shown in FIG. 5, the pin has opposed flat faces for spring engagement.

Figure 4:
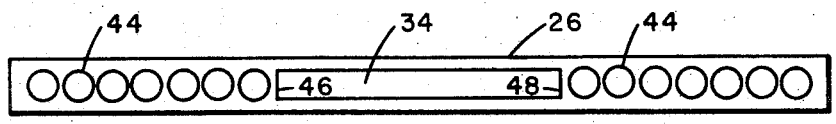
FIG. 4 is an elevation of a spacer.

FIG. 4 is an elevation of a spacer. Material is preferably phosphor bronze, and preferably thin relative to the thickness of the balls used, as in the order of 0.1 to 0.2 ball diameter.

Holes 44 are cylindrical and initially size to size with the ball diameters used. Aperture 34 is about the width of the ball diameter, and extends longitudinally between squared ends 46 and 48 a sizeable fraction of the length of the spacer. Spring diameter is chosen to be somewhat less than ball diameter, so that the springs fit within the spacer aperture and the way races with small clearance all around. As will be seen this clearance contributes to damping of the springs.

The spacer preferably has an antifriction coating, as for example, Teflon coating.

The adjacent sides of the stationary and moving way, 50 and 52 respectively, in FIG. 1, are finished vertically parallel. Proportions of race depth, ball diameter, and spacer thickness are chosen such that the vertical gaps 54, FIGS. 1 and 3, between the moving and stationary ways, are uniform and are only slightly greater than the thickness of the spacers. The spacers project both up and down into these gaps.

In symmetrical stroke operation, migration of the balls toward an average position nearer either end of the way system is prevented by the spring centering arrangement. All migration is not inhibited; if the stroke is asymmetrical with respect to the pin, the balls will tend to center on the stationary way through migration relative to the moving way.

Longitudinal centering of the spacer and ball assembly is maintained in conjunction with suppression of longitudinal backlash of the spring and spacer assembly, and of the balls, by a combination of provisions of this invention, as follows:

Pin 28 is fixed to the stationary way, and the opposed ends of the springs bear on the pin and are, effectively, fixed to the stationary way.

Under spring constraint, the spacer constantly urges the balls toward the center with a restoring force proportional to displacement.

The springs are so proportioned to the system as to preload spacer 26 when the spacer assembly is centered on pin 30, so that there is no spring backlash as the spacer passes center. Travel of the spacer in either direction from the center position is resisted increasingly on compression of one of the springs and assisted decreasingly on extension of the other spring. The springs are also so proportioned to the assembly that, at the extremes of travel of the spacer, the particular spring being extended is not extended to the limit, thus preserving a degree of preloading and avoiding spring backlash at the turnaround.

Lateral backlash of the moving way is suppressed by forces on the ways applied through the inclined way surfaces and the balls. The opposed symmetry of the inclined surfaces tends to center the moving way member at all times.

In operation, ball-to-spacer backlash is inhibited in several ways. As the spacer assembly passes through center, the spring restoring force passes through zero (a preloaded zero) and reverses sign. The balls, pinched between the ways and driven by the moving way, continue on course. The sign reversal of the restoring force tends to cause backlash at this point.

However, such backlash effects between ball and spacer assembly are diminished to the point of toleration according to the following provisions of this invention.

First of all, as previously stated, the balls are made almost size to size with the holes in the spacer, leaving little room for backlash. Secondly, plural balls are used per spacer—in the embodiment being described the number is fourteen—thus averaging out inequalities.

If one entire group of balls get "out of step" with the other, the reduced central part of the spacer accommodatively elongates, or as the case may be, buckles and is aided in straightening by the springs. Longitudinal misalignment in the device of the two sets of holes for the balls will also be accommodated by distortion of the reduced central portion of the spacer.

The groups or sets of balls are in spaced relation, with the opposed compression springs disposed between the sets. The force curve of the compression springs tending to deform the spacer is symmetrical about the center position, to either side of which it is nonlinear. As the spacer approaches and passes the center position, the length of the spacer thus is changed by change in the force curve, and the spacing between the two sets of holes is altered, tending slightly to bind the spacer on the balls and to eliminate backlash gaps at this point.

In addition to ball-to-spacer longitudinal backlash, lateral vibrations of the spacer induced by the balls can be a problem. In a reciprocating assembly of this nature, although the spacer reciprocates with the balls at half the amplitude and rate of the moving way, accelerations can be relatively high.

As result of accelerations and the inevitable inequalities of mechanical construction, there is a tendency for individual balls to get out of step with others, and for the moving parts to vibrate as result. Vibration of the parts may occur independently, or together, and at one or more positions or rates of operation.

An example of an origin of such backlash in a reciprocating system can readily be seen by examining the view of the assembly of spacer 26 and balls 20 in FIG. 3. As the moving way 18 is drawn toward the viewer by drive member 42, all balls in the spacer to the left of the moving way will rotate clockwise in plan. As the moving way is reversed and pushed away from the viewer, the balls will rotate counterclockwise in plan.

Starting with the moving way pushed to the extreme limit away from the viewer, what happens to the spacer on the left side is to be noted.

As the way is drawn toward the viewer, the balls rotate in clockwise direction. The springs cause the spacer to bear on the trailing edges of the balls, initially, so that rotation of the balls tends to thrust the spacer toward the right of the viewer.

As the way system passes through center, the longitudinal spring forces become neutral. Lateral forces on the spacer, which presumably average out at dead center, then reverse as the longitudinal spring forces retard the spacer, drawing it against the leading surfaces of the balls. As result, the spacer tends to be thrust to the left of the viewer by rotation of the balls.

There may also be localized lateral forces on the spacers as individual balls are advanced or retarded with respect to the norm.

Such lateral motions of the spacer are prevented from coupling with the springs and developing into oscillations. This is accomplished through the loosely defining design of the spring installation which provided practically no lateral restoring force for the spacer such as would be the case if the springs were otherwise disposed, i.e. as would be the case if they were tension springs drawing oppositely on the ends of the spacer.

Lateral motions of the spacer are limited by the vertical sides 50, 52, of the ways, and in this context, with the non-defining spring installation of this invention, the spacer can be said to be laterally bistable.

As earlier noted, the spacer projects upward and downward into the vertical gaps between the stationary and moving ways. These gaps are by design only fractionally greater than the thickness of the spacers. As result, spacer motion from side to side is limited to substantially less than spacer thickness. Since the holes through the spacers are cylindrical, this means that the major diameter of each ball always lies within some portion of the respective cylindrical hole, so that the tolerance between ball and hole never varies as it would if relative motion passed the major diameter of the ball out of the hole, or if the hole were not cylindrical.

Damping is further effected by oil or light grease, applied between the sides of the ways and the spacer. The spacer easily shears the lubricant film on longitudinal motion of the assembly, transferring excess lubricant at the leading edge from the surface of one side 50, or 52, to the other. Surface tension between the sides of the ways and the sides of the spacer inhibits lateral motion of the spacer, suppressing oscillatory tendencies. Vibration of the springs is likewise inhibited by viscous lubricant between the coils, between the springs and the spacer, and between the springs and the raceway.

Figure 6:
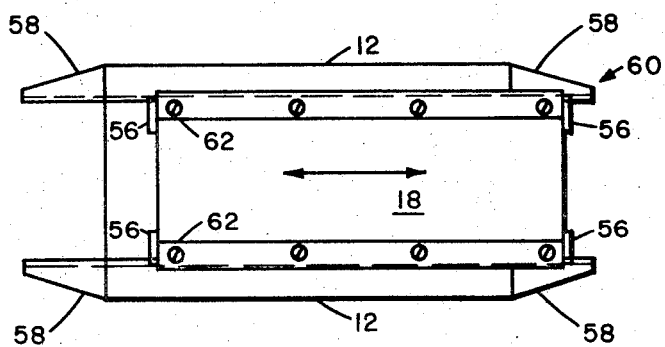
FIG. 6 is a plan view of an embodiment of a way system.

In conclusion, two examples of the utility of the center spring configuration of this invention are indicated in FIG. 6, which shows a simple method of sealing the end apertures of the ways.

Way system 60 is shown in plan view, 18 being the moving way and 12 the stationary way members. A spacing and centering device is installed on each side as described above. Newly shown are felt seals 56 on the ends of moving way 18, and way extensions 58. The way extensions are smooth continuations of the ways and raceways, secured to the ends of the stationary way members 12 for sealing purposes.

This simple structure seals the end apertures in the ways, protecting the spacer assembly from entrance of foreign material there. Note that the absence of protruding springs at the ends makes the end apertures as simple to seal as the long seams, which are shown with felt seals 62 affixed to the moving way.

The central location of the springs, particularly when the ways are sealed, also tends to keep the springs at the same temperature, preserving exact equality of spring constant.

Although the various embodiments have been described specifically and in detail, it is to be understood that this invention may be practiced otherwise than in the precise detail given without departure from the spirit of the invention.

I claim:

1. A way system comprising stationary way means, moving way means, separated ball means for laterally relating all said way means, spacer means for relating said separated ball means, and resilient means central of said spacer means for relating the spacer means to a said way means, said stationary way means and moving way means having a gap therebetween, said spacer means being flat and having extension into the gap, the spacer means having a central aperture, a pin fixed in a way means and protrusive into the aperture, and the resilient means engaging the spacer means and pin.

2. A way system as recited in claim 1, the resilient means comprising spring members opposed against the pin and bearing oppositely on respective ends of said aperture, thereby tensioning said central portion of the spacer.

3. A way system as recited in claim 2, the spring members comprising coiled compression springs each having an extended length greater than the length of said aperture less the thickness of the pin and the compressed length of a said spring, whereby backlash is avoided on extension of a said spring.

4. A way system as recited in claim 3, and a member affixed to an end of a said spring.

5. A way system as recited in claim 3, the spacer means having cylindrical holes through the thickness thereof for receiving the outer diameter of the ball means, the thickness of the spacer means being at least half the gap into which the spacer means is extended.

6. A way system as recited in claim 5, the respective way means having recessed raceways receiving the ball means, the spacer aperture having a width approximating the diameter of the ball means and the spring members having a diameter approximating but less than the ball means diameter, whereby the spring members are adapted for stabilization vertically by the spacer and laterally by the way means.

7. A way system as recited in claim 6, viscous means between the spacer extension and the way means in the gap, and viscous means on a spring member.

8. A way system as recited in claim 7, the spacer means having Teflon coating.